United States Patent
Riaz et al.

(10) Patent No.: US 11,449,534 B2
(45) Date of Patent: Sep. 20, 2022

(54) SYSTEMS AND METHODS FOR CONDUCTING LEGAL RESEARCH ACROSS MULTIPLE JURISDICTIONS

(71) Applicant: Thomson Reuters Enterprise Centre GmbH, Zug (CH)

(72) Inventors: Kashif Riaz, Eagan, MN (US); Erica Kitaev, Denver, CO (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

(21) Appl. No.: 16/160,130

(22) Filed: Oct. 15, 2018

(65) Prior Publication Data

US 2019/0114357 A1    Apr. 18, 2019

Related U.S. Application Data

(60) Provisional application No. 62/571,811, filed on Oct. 13, 2017.

(51) Int. Cl.
*G06F 16/332* (2019.01)
*G06Q 50/18* (2012.01)
*G06F 16/33* (2019.01)
*G06F 16/9537* (2019.01)

(52) U.S. Cl.
CPC ...... *G06F 16/3328* (2019.01); *G06F 16/3325* (2019.01); *G06F 16/3349* (2019.01); *G06F 16/9537* (2019.01); *G06Q 50/18* (2013.01)

(58) Field of Classification Search
CPC ...... G06Q 50/18; G06F 16/3325; G06F 16/34
See application file for complete search history.

(56) References Cited

U.S. PATENT DOCUMENTS

| | | | | |
|---|---|---|---|---|
| 6,064,968 A * | 5/2000 | Schanz | ................... | G06Q 99/00 705/311 |
| 8,316,001 B1 * | 11/2012 | Albrecht | ................. | G06F 9/451 707/706 |
| 2004/0199502 A1 * | 10/2004 | Wong | ................. | H04N 21/6175 |
| 2004/0243391 A1 * | 12/2004 | Nelson | .................... | G06F 16/40 704/2 |
| 2005/0228788 A1 * | 10/2005 | Dahn | .................... | G06F 16/951 |
| 2006/0041607 A1 * | 2/2006 | Miller | ................. | G06F 16/3325 |
| 2006/0101027 A1 * | 5/2006 | Hotchkiss | .............. | G06Q 99/00 |
| 2006/0242135 A1 * | 10/2006 | Weare | ................. | G06F 16/9535 |
| 2007/0239706 A1 * | 10/2007 | Zhang | .................. | G06F 16/382 |

(Continued)

*Primary Examiner* — William Spieler
(74) *Attorney, Agent, or Firm* — Antonio Papageorgiou; Lombard & Geliebter LLP

(57) ABSTRACT

The present invention is directed towards systems and methods for conducting legal research across multiple jurisdictions, which comprises receiving a first user search query at a graphical user interface comprising one or more search terms, executing the first search query against a first jurisdictional database and identifying one or more search results that are responsive to the first search query. Upon receiving a selected search result, a modified search query is generated comprising the one or more search terms of the first search query and one or more relevant terms from the selected search result and is executed against a second jurisdictional database. One or more secondary search results that are responsive to the modified search query are identified and then presented at the graphical user interface.

12 Claims, 8 Drawing Sheets

(56) References Cited

U.S. PATENT DOCUMENTS

| | | | |
|---|---|---|---|
| 2008/0109845 A1* | 5/2008 | Hengel | G10L 13/00 |
| | | | 725/36 |
| 2009/0083328 A1* | 3/2009 | Vivona | G06Q 10/10 |
| 2010/0070265 A1* | 3/2010 | Nelson | G06F 40/58 |
| | | | 704/8 |
| 2011/0208769 A1* | 8/2011 | Kemp | G06Q 50/18 |
| | | | 707/769 |
| 2012/0124180 A1* | 5/2012 | Krauland | G06Q 50/18 |
| | | | 709/219 |
| 2012/0166425 A1* | 6/2012 | Sharma | G06F 16/338 |
| | | | 707/722 |
| 2013/0013999 A1* | 1/2013 | Kerry-Tyerman | G06Q 50/18 |
| | | | 715/230 |
| 2014/0379591 A1* | 12/2014 | Benner | G06Q 50/18 |
| | | | 705/311 |
| 2016/0314146 A1* | 10/2016 | Carothers | G06F 16/38 |
| 2016/0314547 A1* | 10/2016 | Carothers | G06F 16/24 |
| 2017/0235799 A1* | 8/2017 | Miller | G06F 16/338 |
| | | | 707/722 |
| 2018/0052908 A1* | 2/2018 | Liu | G06F 16/316 |

\* cited by examiner

SYSTEMS AND METHODS FOR CONDUCTING LEGAL RESEARCH ACROSS MULTIPLE JURISDICTIONS

RELATED APPLICATION

This application claims priority to U.S. Provisional Application 62/571,811 filed on Oct. 13, 2017, the contents of which are incorporated herein in their entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright © 2018 Thomson Reuters.

TECHNICAL FIELD

This disclosure relates generally to performing legal research. More specifically, the disclosure is directed towards systems and methods for conducting legal research across multiple jurisdictions.

BACKGROUND

Legal professionals throughout all stages of their careers rely heavily on legal research to understand the current state of the law. Traditionally, in order to conduct legal research on a particular subject, researchers were required to carefully craft search strategies and apply such strategies to existing court opinions, motions, briefs, transcripts, secondary sources such as treatises or articles, statutes, web pages, etc. Oftentimes, such search strategies would need to be done repeatedly across multiple jurisdictions to compare legal obligations or requirements. Currently, this research is a highly manual process that requires the legal professional to separately research the question in each jurisdiction, locate the correct answer, and capture the answer in a chart or other document for comparison. Oftentimes, this manual process loses certain of the potential refinements that may be uncovered based on the content that has already been identified as relevant. For example, when searching for a legal issue across legal documents in the State of New York, the results that the researcher finds relevant may include relevant concepts that are not part of the original search query, but may be nonetheless helpful in refining future searches. According there exists a need systems and methods that refines legal research across jurisdictional databases.

SUMMARY

The present invention is directed towards systems and methods for conducting legal research across multiple jurisdictions, which comprises receiving a first user search query at a graphical user interface comprising one or more search terms, executing the first search query against a first jurisdictional database and identifying one or more search results that are responsive to the first search query. Upon receiving a selected search result, a modified search query is generated comprising the one or more search terms of the first search query and one or more relevant terms from the selected search result and is executed against a second jurisdictional database. One or more secondary search results that are responsive to the modified search query are identified and then presented at the graphical user interface.

According to one embodiment, upon receiving a selected secondary search result, the system compares the selected search result to the selected secondary search result and presents the comparison of the selected search result to the selected secondary search result at the graphical user interface.

According to another embodiment, upon receiving a selected secondary search result, a second modified search query comprising the one or more search terms of the modified search query and one or more relevant terms from the selected secondary search result is generated and executed against a third jurisdictional database. One or more tertiary search results that are responsive to the second modified search query are identified and presented at the graphical user interface.

A system, as well as articles that include a machine readable medium storing machine-readable code for implementing the various techniques, are disclosed. Details of various embodiments are discussed in greater detail below.

Additional features and advantages will be readily apparent from the following detailed description, the accompanying drawings and the claims.

BRIEF DESCRIPTION OF THE DRAWINGS

Like reference symbols in the various drawings indicate like elements.

DETAILED DESCRIPTION

In the following description, reference is made to the accompanying drawings that form a part hereof, and in which is shown by way of illustration specific embodiments in which the disclosure may be practiced. It is to be understood that other embodiments may be utilized and structural changes may be made without departing from the scope of the present disclosure.

In general, the systems and methods described herein may relate to improvements to aspects of searching for information using a computer. These improvements not only improve the functioning of how such a computer (or any number of computers employed in the search) is able to operate to serve the user's research goals, but also improves the accuracy, efficiency and usefulness of the search results that are returned to the searcher.

The present system may be described in the context of information being comprised in "documents." In this sense, a document is simply a logical container for information. Examples of documents in the legal research field may include, for example, court opinions, motions, briefs, transcripts, secondary sources such as treatises or articles, statutes, web pages, etc. Documents may also comprise issue summaries or index headings rather than judicial opinions, briefs, secondary source chapters or other longer-format documents. For example, a document that is returned by the system may be a Westlaw Key Number, headnote or American Law Review ("ALR") article. It is also possible that one document may exist within another document—for example a book may be considered a document and also each chapter within that book may also be considered a document.

Figure 1:
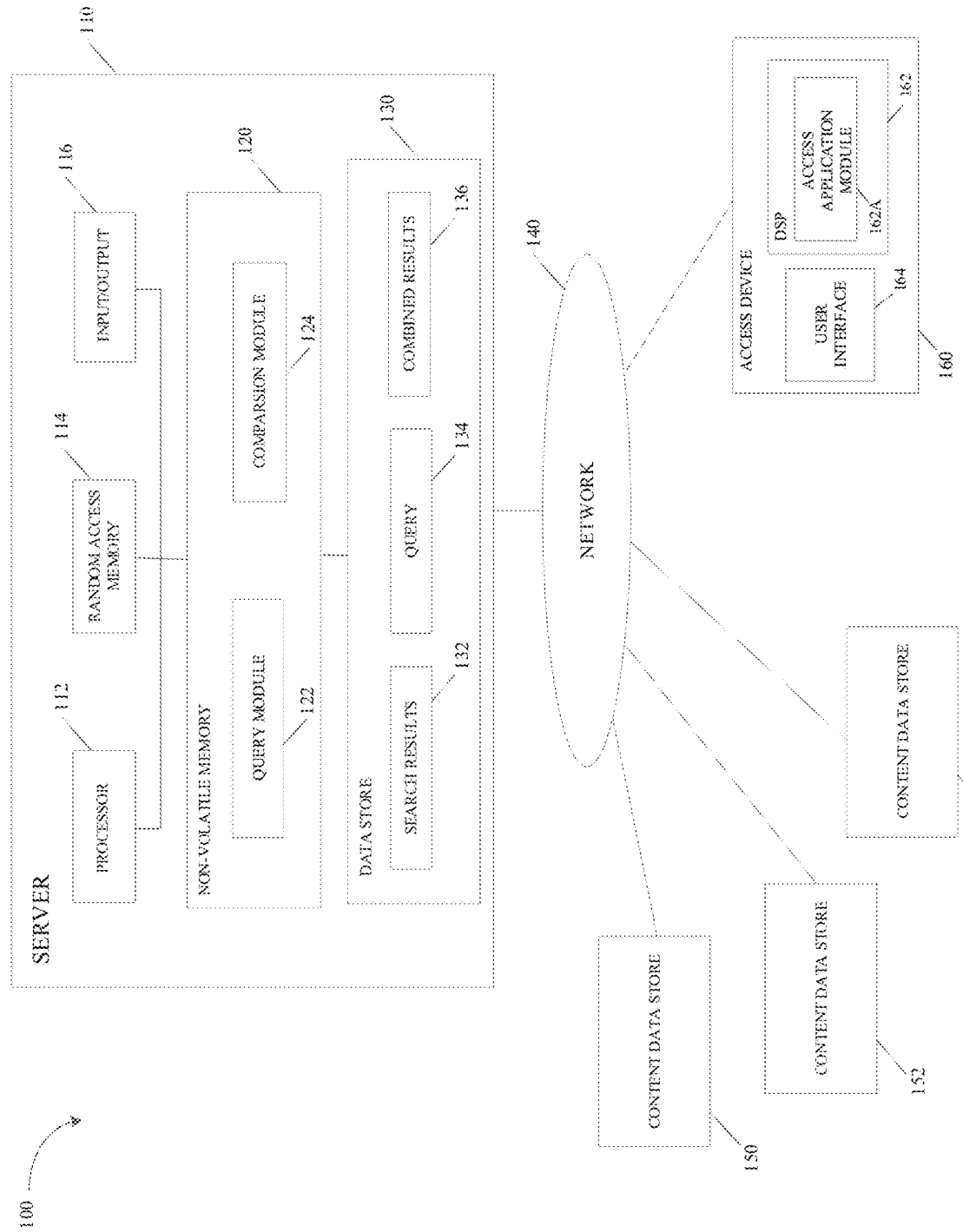
FIG. 1 is a schematic depicting an exemplary computer-based system for conducting legal research across multiple jurisdictions.

Turning now to FIG. 1, an example of a suitable computing system 100 within which embodiments of the disclosure may be implemented is presented. The computing system 100 is only one example and is not intended to suggest any limitation as to the scope of use or functionality of the disclosure. Neither should the computing system 100 be interpreted as having any dependency or requirement relating to any one or combination of illustrated components.

For example, the present disclosure is operational with numerous other general purpose or special purpose computing consumer electronics, network PCs, minicomputers, mainframe computers, laptop computers, as well as distributed computing environments that include any of the above systems or devices, and the like.

The disclosure may be described in the general context of computer-executable instructions, such as program modules, being executed by a computer. Generally, program modules include routines, programs, objects, components, data structures, loop code segments and constructs, and other computer instructions known to those skilled in the art that perform particular tasks or implement particular abstract data types. The disclosure can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art may implement the description and figures as processor executable instructions, which may be written on any form of a computer readable media. In one embodiment, with reference to FIG. 1, the system 100 includes a server device 110 configured to include a processor 112, such as a central processing unit ("CPU"), random access memory ("RAM") 114, one or more input-output devices 116, such as a display device (not shown) and keyboard (not shown), non-volatile memory 120 and a data store 130, all of which are interconnected via a common bus and controlled by the processor 112.

According to one embodiment processor 112 is central processing unit ("CPU") that use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

As shown in the FIG. 1 example, in one embodiment, the non-volatile memory 120 is configured to include a query module 122 and a comparison module 124. The query module 122 serves to receive the questions and selected search results from the access device 160, generate modified search queries and execute different search query types against data repositories. According to one embodiment, the comparison module 124 is utilized to perform a comparison and provide relevant results comparing selected search results across multiple jurisdictions A more detailed description as to how the query module 122 and the comparison module 124 will be discussed in the description of the processes outlined in FIGS. 2 through 8.

As shown in FIG. 1, in one embodiment, a network 140 is provided that can include various devices such as routers, server, and switching elements connected in an Intranet, Extranet or Internet configuration. Networks are commonly thought to comprise the interconnection and interoperation of access devices, servers, and intermediary nodes in a graph topology. It should be noted that an intermediary node includes a computer, other device, program, or combination thereof that facilitates, processes information and requests, and/or furthers the passage of information from a source user to a destination. Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

In one embodiment, the network 140 uses wired communications to transfer information between an access device 160, the server device 110 and content data stores 150, 152 and 154. In another embodiment, the network 140 employs wireless communication protocols to transfer information between access device 160, the server device 110, the content data stores 150, 152 and 154. For example, the network 140 may be a cellular or mobile network employing digital cellular standards including but not limited to the 3GPP, 3GPP2 and AMPS family of standards such as Global System for Mobile Communications (GSM), General Packet Radio Service (GPRS), CDMAOne, CDMA2000, Evolution-Data Optimized (EV-DO), LTE Advanced, Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). The network 140 may also be a Wide Area Network (WAN), such as the Internet, which employs one or more transmission protocols, e.g. TCP/IP. As another example, the network 140 may employ a combination of digital cellular standards and transmission protocols. In yet other embodiments, the network 140 may employ a combination of wired and wireless technologies to transfer information between the access device 160, the server device 110, the content data stores 150, 152 and 154.

According to one embodiment, the content data stores 150, 152 and 154 are repositories that maintains and stores legal documents, such as court decisions, litigation dockets and filings, legal treatises, law review articles and annotations thereto. According to one embodiment, content data stores 150, 152 and 154 each comprise legal documents from a single jurisdiction, e.g. content data store 152 comprises legal documents from the State of New York, content data store 150 comprises legal documents from the State of California and content data store 154 comprises legal documents from the State of Texas. In another embodiment, the content data stores 150, 152 and 154 comprise, in addition to legal documents for specific jurisdictions, news documents from one or more news organizations, such as REUTERS, relevant to the specific jurisdiction, as well as non-news and non-legal documents that are relevant to the search query and are generally available on the accessible Internet. It is important to note that the presents system is not limited to solely three content data stores representative of relevant content from three distinct jurisdictions, but may include a plethora of distinct jurisdictional content data stores or may include a single data repository with content structured by jurisdiction.

In one embodiment, the data store 130 is a repository that maintains and stores information utilized by the before-mentioned modules 122 and 124. In one embodiment, the data store 130 is a relational database. In another embodiment, the data store 130 is a directory server, such as a Lightweight Directory Access Protocol ("LDAP"). In yet another embodiment, the data store 130 is an area of non-volatile memory 120 of the server device 110.

In one embodiment, as shown in the FIG. 1 example, the data store 130 includes a search results data store 132, a query data store 134 and a combined results data store 136. According to one embodiment, the search results data store 132 maintains responsive to the different search queries executed by the query module 122. The query data store 134 maintains a listing of all queries executed by the query module 122 and the combined results data store 136 maintains a listing of combined search results and all generated jurisdictional comparison data.

Although the data store 130 shown in FIG. 1 is connected to the network 140, it will be appreciated by one skilled in the art that the data store 130 and/or any of the information shown therein, can be distributed across various servers and be accessible to the server 110 over the network 140; be coupled directly to the server 110; be configured as part of server 110 and interconnected to processor 112, RAM 114, the one or more input-output devices 116 and the non-volatile memory 120 via the common bus; or be configured in an area of non-volatile memory 120 of the server 110.

The access device 160, according to one embodiment, is a computing device comprising: a touch-sensitive graphical user interface ("GUI") 164, a digital signal processor ("DSP") 162 having an access application module that allows a user to access the server 110, access application module 162A, transient and persistent storage devices (not shown); an input/output subsystem (not shown); and a bus to provide a communications path between components comprising the general purpose or special purpose computer (not shown). According to one embodiment, access application module 162A is web-based and uses thin client applications (not shown), such as a web browser, which allows a user to access the server 110. Examples of web browsers are known in the art, and include well-known web browsers such as such as MICROSOFT® INTERNET EXPLORER®, GOOGLE CHROME™, MOZILLA FIREFOX® and APPLE® SAFARI®. According to another embodiment, access device 180 is a mobile electronic device having a GUI, a DSP having an access application module, internal and external storage components; a power management system; an audio component; audio input/output components; an image capture and process system; RF antenna; and a subscriber identification module (SIM) (not shown). Although system 100 is described generally herein as comprising a single access device 160, it should be appreciated that the present invention is not limited to solely two access devices. Indeed, system 100 can include multiple access devices.

Further, it should be noted that the system 100 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output of the system is communicated from the computing device to a display device, such as a computer monitor.

Figure 2:
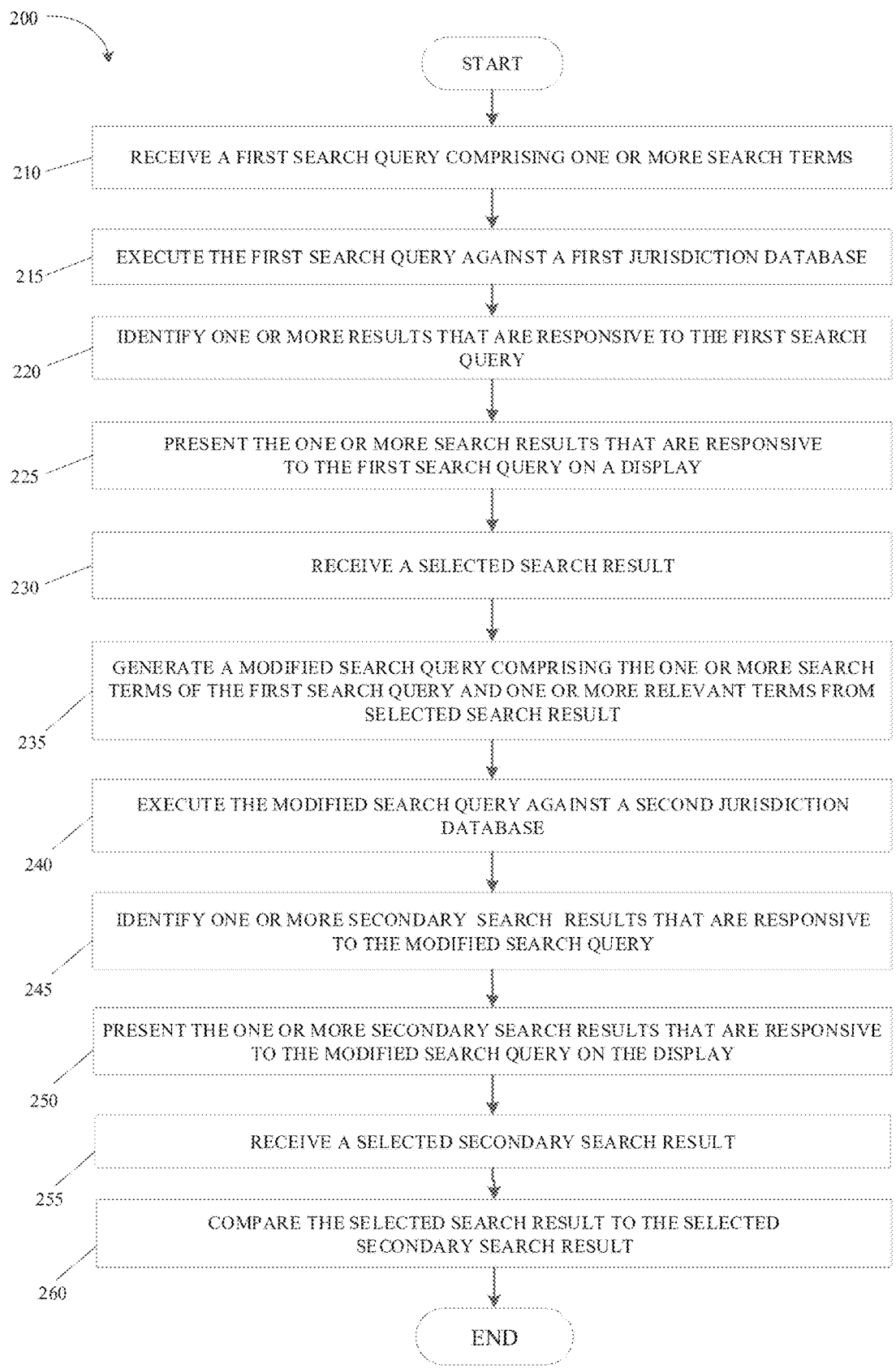
FIG. 2 is a flow diagram illustrating an exemplary computer-implemented method for conducting legal research across multiple jurisdictions.
Figure 3:
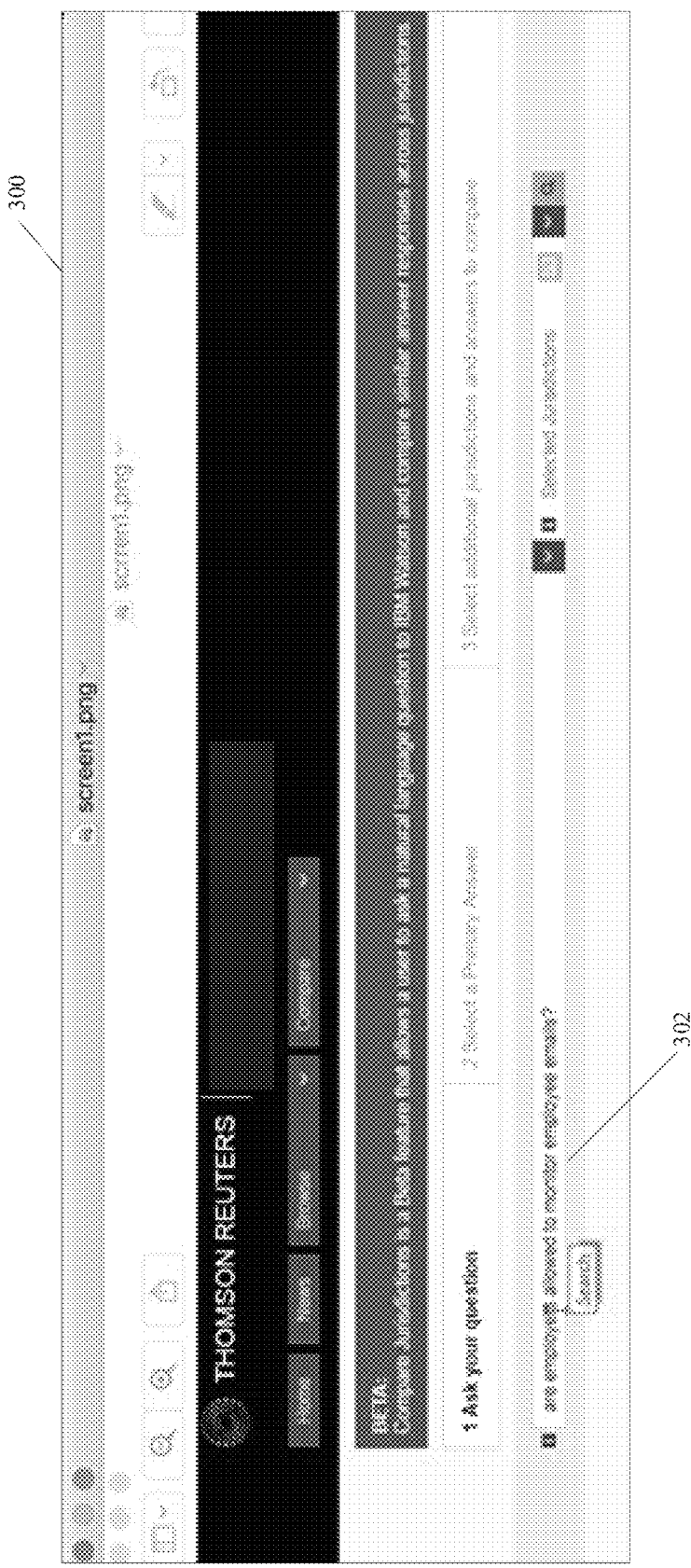
FIG. 3 is a is a screen diagram of an exemplary graphical representation used in conducting legal research across multiple jurisdictions.

Turning now to FIG. 2, an exemplary method 200 for conducting prospective legal research is disclosed in the context of system 100 of FIG. 1. The exemplary method begins with the receipt of a first search query initiated by a user comprising one or more search terms at the graphical user interface 164 of the access device 160, step 210. For example, a user may enter the search query "are employers allowed to monitor employee emails?" in the graphical user interface 164, similar to a search field 302 of exemplary user interface 300 presented in FIG. 3.

Once entered, the search query initiated by the user is submitted to query module 122 over the network 140. The query module 122, upon receipt of the initiated user search query, executes the first search query against a first jurisdiction database, such as content data store 150, step 215. For example, the search query "are employers allowed to monitor employee emails?" is submitted with a selected jurisdiction, such as the State of Delaware, which is received by the query module 122 and executed against the appropriate date store or portion of a data store comprising State of Delaware legal documents, and a record of the search query is generated and stored in the query data store 134. In one embodiment, execution of the search query comprises removal of non-functional words, such as the word "to" in the exemplary search query, and the remaining keywords are converted into word vectors using Word2Vec modeling. In one embodiment, suggestions processes are utilized to execute the search, which may include expansion of the search query using well known techniques in the field, including but not limited to stemming techniques and tokenization, as well as the suggestion of secondary or alternate search terms. In one embodiment, execution of the search query is accomplished by utilization of a Recurrent Deep Neural Network with a LSTM (Long Short-Term Memory) configuration, although other machine learning techniques for search may be used.

Figure 4:
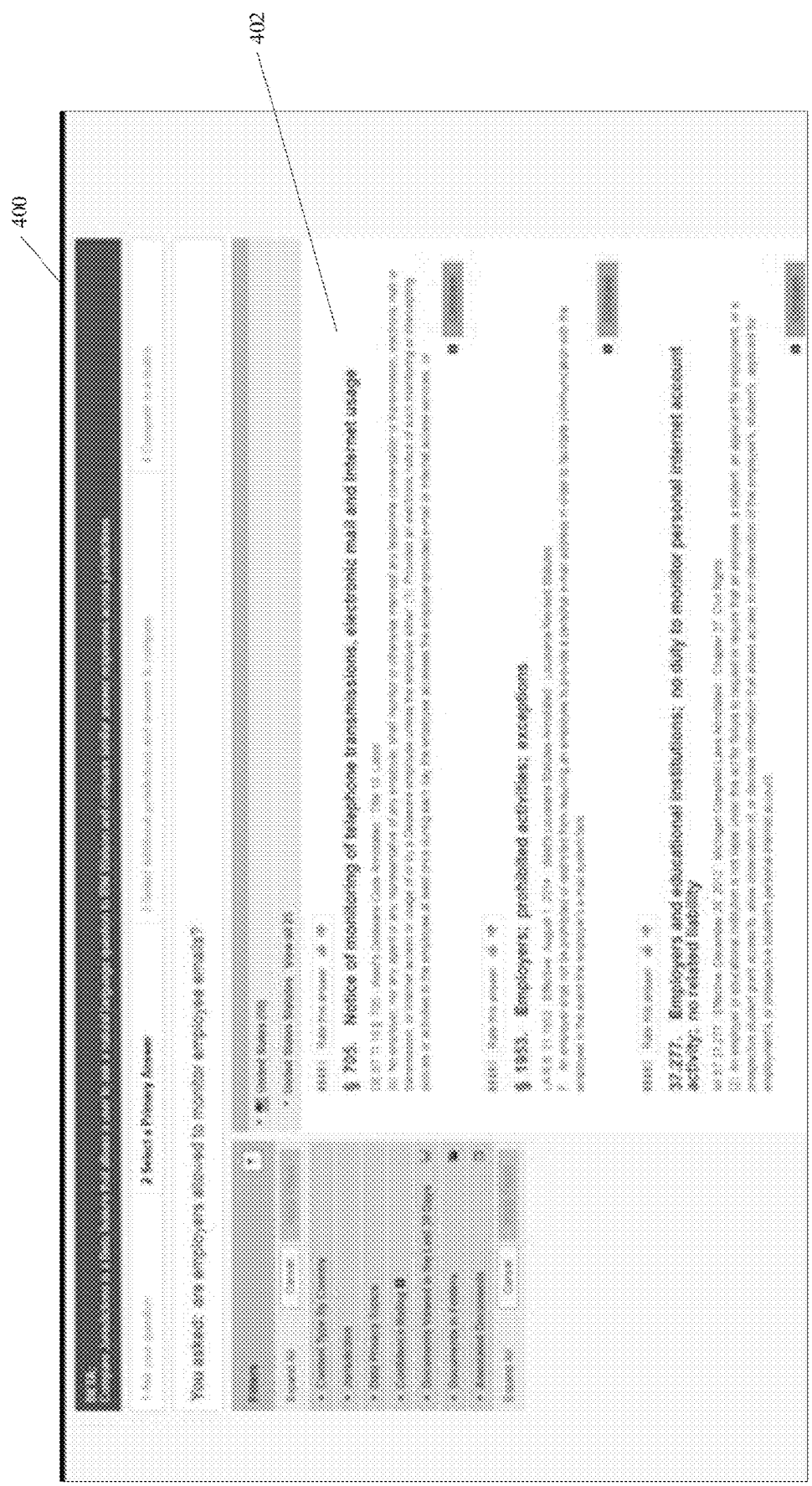
FIG. 4 is a is a screen diagram of an exemplary graphical representation used in conducting legal research across multiple jurisdictions.

Returning to FIG. 2, according to one embodiment, one or more search results that are responsive to the first search query are identified by the query module 122 and stored in the search results data store 132, step 220, and are subsequently presented on a display to the user, step 225. For example, in response to the search query "are employers allowed to monitor employee emails?" for the selected jurisdiction State of Delaware, query module 122 identifies several Delaware statutes relevant to the topics of monitoring electronic mail. An exemplary user interface 400 presented on user interface 164 shows a listing of search results to the original search query is illustrated in FIG. 4. As is shown in user interface 400, the first listing responsive to the exemplary search query is search result 402, which is a Delaware state statute titled, "Notice of monitoring of telephone transmission, electronic mail and internet usage," with the citation of DE ST T1 19 sec. 705. According to one embodiment, the responsive search results are presented in a ranked order using machine learning methodologies as is known in the art.

Figure 5:
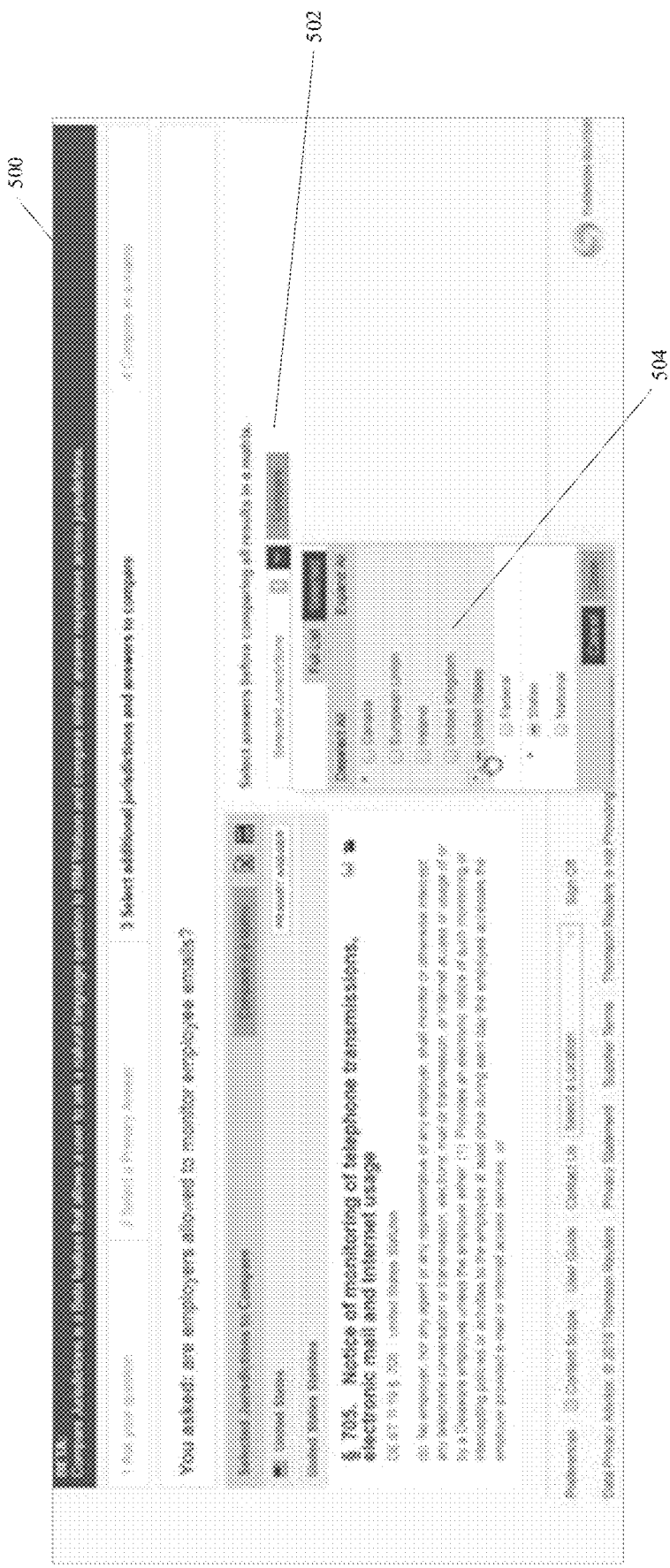
FIG. 5 is a is a screen diagram of an exemplary graphical representation used in conducting legal research across multiple jurisdictions.

A search result is then selected by the user at the access device 160 and received by the query module 122 and stored in the combined results data store 136, step 230. For example, a user in reviewing the listing of search results identifies the search result 402 from FIG. 4 as relevant, at which point user interface 500 of FIG. 5 is presented on the user interface 164 of the access device 160. According to one embodiment, an option is presented to the user to compare the selected search result to available content in or more other jurisdictions. As illustrated in FIG. 5, user interface 500 includes a radio button 502 labeled "Compare" and a selectable listing of jurisdictions 504, whereby a user can select one or more jurisdictions from the listing 504 and signal the comparison module 124 to perform a comparison by selecting radio button 502. For example, the user may have selected the first ranked search result, Delaware state statute titled, "Notice of monitoring of telephone transmission, electronic mail and internet usage," with the citation of DE ST T1 19 sec. 705, and subsequently selected New York as a jurisdiction to compare to.

Returning to FIG. 2, a modified search query comprising the one or more search terms of the first search query and one or more relevant terms from the selected search result is generated, step 235. According to one embodiment, the query module 122, upon instruction from the comparison module 124 having received an instruction to compare, generates a modified search query using the functional keywords from the original query "are employers allowed to monitor employee emails?" and as well as the functional keywords from the text of the selected search result, Delaware state statute titled, "Notice of monitoring of telephone transmission, electronic mail and internet usage," with the citation of DE ST T1 19 sec. 705. The enhanced search query is the union of the original search query and the selected search result with non-functional words removed. For example, the modified search query may include word vectors covering "employers allowed monitor employee emails no employer, nor any agent or any representative of any employer . . . ." Modification of the original search query utilizing functional keywords from the selected search result may be accomplished using machine learning techniques, such as those techniques utilizing Word2Vec modeling.

At step 240 of FIG. 2, the modified search query is executed against a second jurisdictional database, such as content data store 152, which is representative of different jurisdiction. For example, the modified search query "employers allowed monitor employee emails no employer, nor any agent or any representative of any employer" is submitted with a second selected jurisdiction, in this instance, the State of Maine, which is received by the query module 122 and executed against the appropriate date store or portion of a data store comprising State of Maine legal documents, and a record of the modified search query is generated and stored in the query data store 134. In one embodiment, execution of the search query is also accomplished by utilization of a Recurrent Deep Neural Network with a LSTM (Long Short-Term Memory) configuration.

Figure 6:
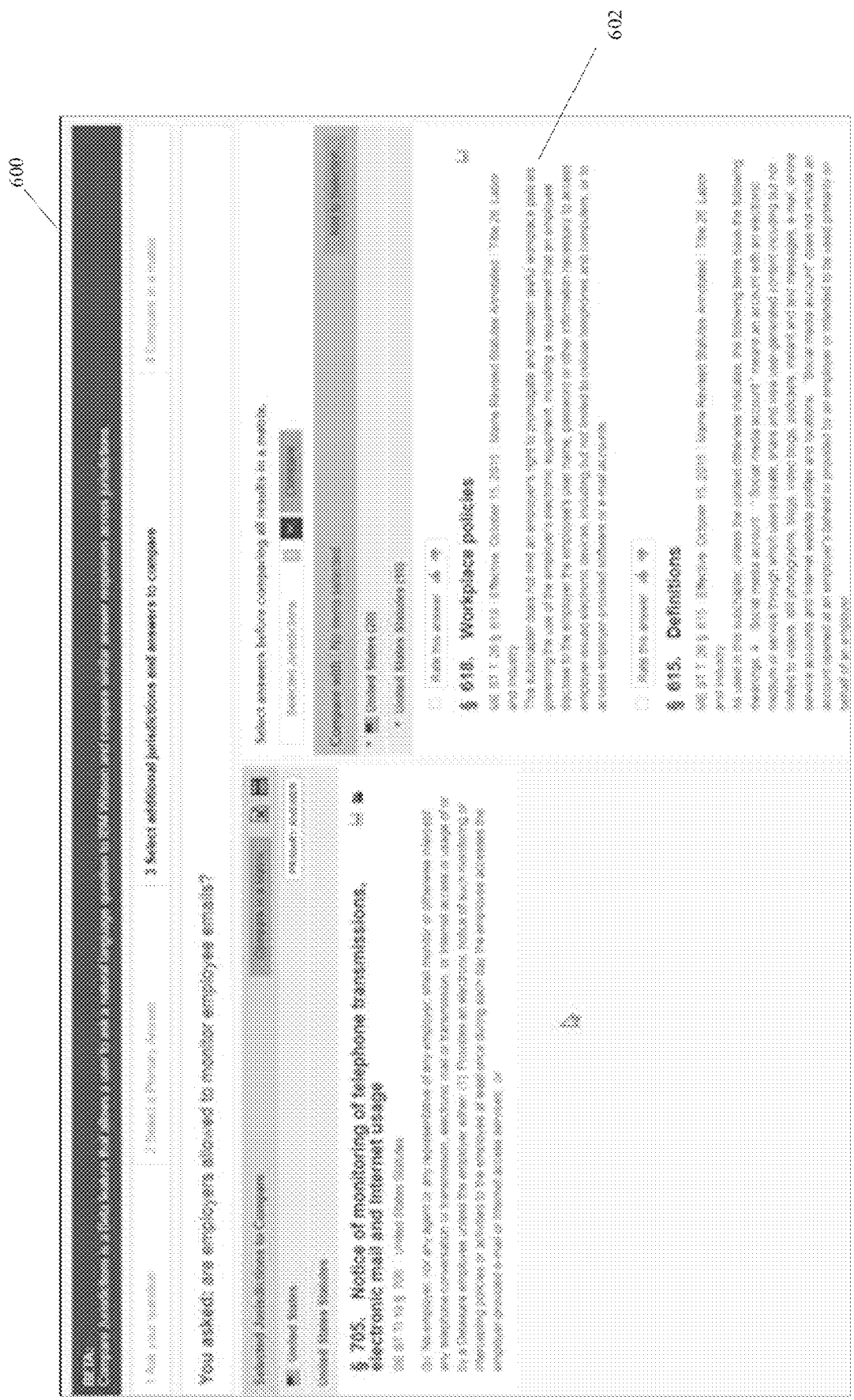
FIG. 6 is a is a screen diagram of an exemplary graphical representation used in conducting legal research across multiple jurisdictions.

One or more secondary search results that are responsive to the modified search query are identified and stored in the search results data store 132, and subsequently resented to the user on the display, such as user interface 164, steps 245 and 250. For example, in response to the modified search query "employers allowed monitor employee emails no employer, nor any agent or any representative of any employer" for the selected jurisdiction State of Maine, query module 122 identifies several Maine statutes relevant to the topics of workplace policies and social media in the workplace. An exemplary user interface 600 presented on user interface 164 shows a listing of secondary search results that are responsive to the modified search query is illustrated in FIG. 6. As is shown in user interface 600, the first listing responsive to the exemplary modified search query is search result 602, which is a Maine state statute titled, "Workplace policies" with the citation of ME ST T 26 sec. 618. According to one embodiment, the responsive search results are presented in a ranked order using machine learning methodologies as is known in the art.

Figure 7:
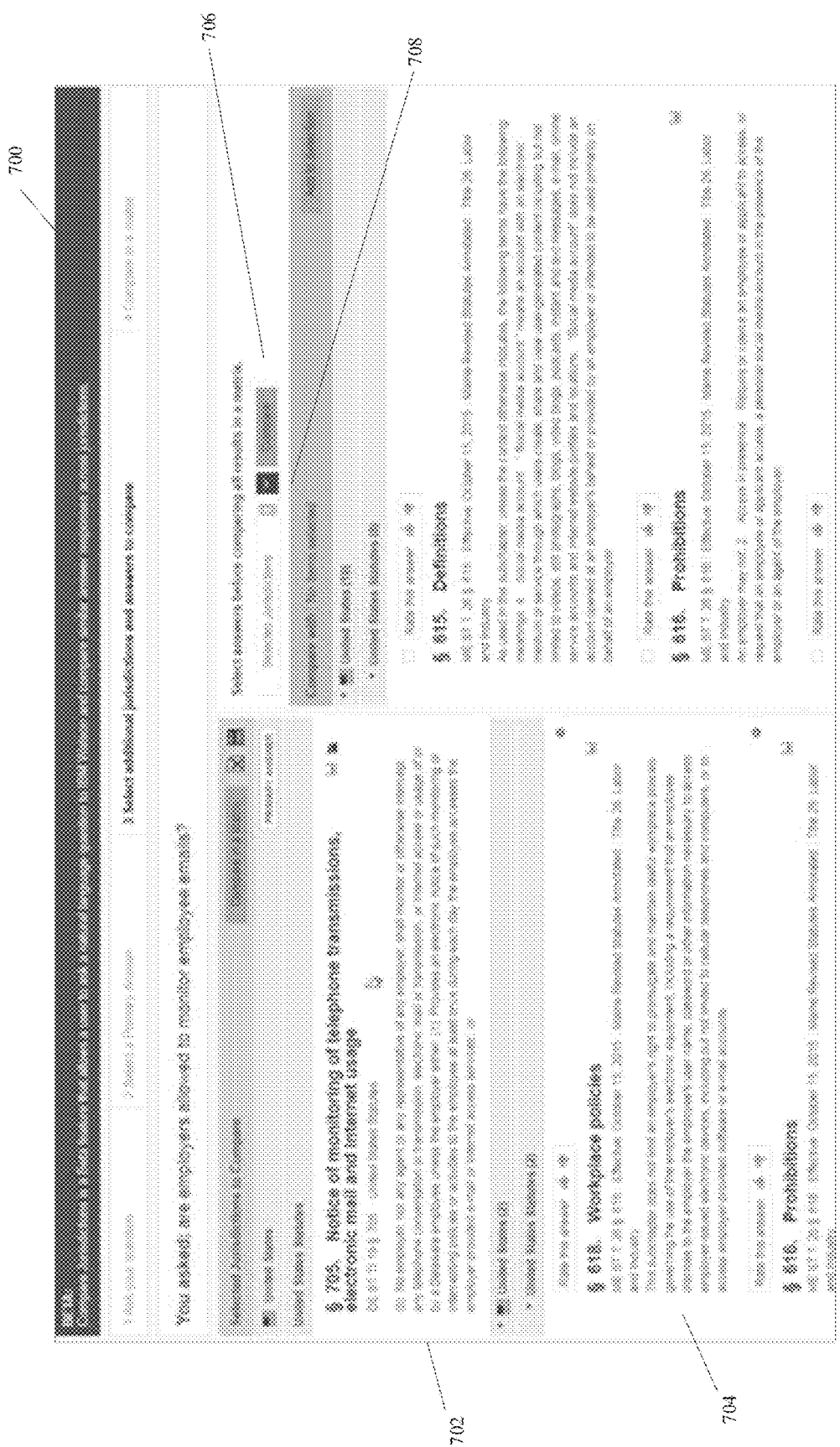
FIG. 7 is a is a screen diagram of an exemplary graphical representation used in conducting legal research across multiple jurisdictions.

Returning to FIG. 2, a selected secondary search result is received by the query module 122 and stored in the combined results data store 136 in association with the corresponding record for the selected search result responsive the original search query, step 255. For example, a user in reviewing the listing of secondary search results identifies the search result 602 from FIG. 6 as relevant, at which point user interface 700 of FIG. 7 is presented on the user interface 164 of the access device 160, which provides both the selected search result responsive to the original search query, identified as search result 702, and the selected search result responsive to the original search query, identified as search result 704. Similar to user interface 500 of FIG. 5, the exemplary user interface 700 of FIG. 7 includes a radio button 706 labeled "Compare" and a selectable listing of jurisdictions (not shown, but accessible by selecting a dropdown option via button 708), whereby a user can select one or more additional jurisdictions from the listing and signal the comparison module 124 to perform a comparison by selecting radio button 706. For example, the user now having selected the first ranked search result, Delaware state statute titled, "Notice of monitoring of telephone transmission, electronic mail and internet usage," with the citation of DE ST T1 19 sec. 705, presented in FIG. 7 as search result 702, and the secondary search result, Maine state statute titled, "Workplace policies" with the citation of ME ST T 26 sec. 618, presented in FIG. 7 as search result 704, can then reiterate the methodology of steps 235 through 255. The result is the generation of a second modified search query that is the union of the original search query, the selected search result and the selected secondary search with non-functional words removed, which is subsequently executed against a third jurisdiction, e.g. State of California. The result is continuously refined set of search results which utilizes the newly verified information from the selected search results. It is important to note that this methodology comprising the steps of 230 through 255 can be performed on an iterative basis, allowing for relevant search results across multiple jurisdictions, as well as further refined search results as jurisdictions are researched. According to one embodiment, the different user-selected answers are can be used as training data to improve the performance of the content search, such as for example, training data to by machine learning search algorithms.

Figure 8:
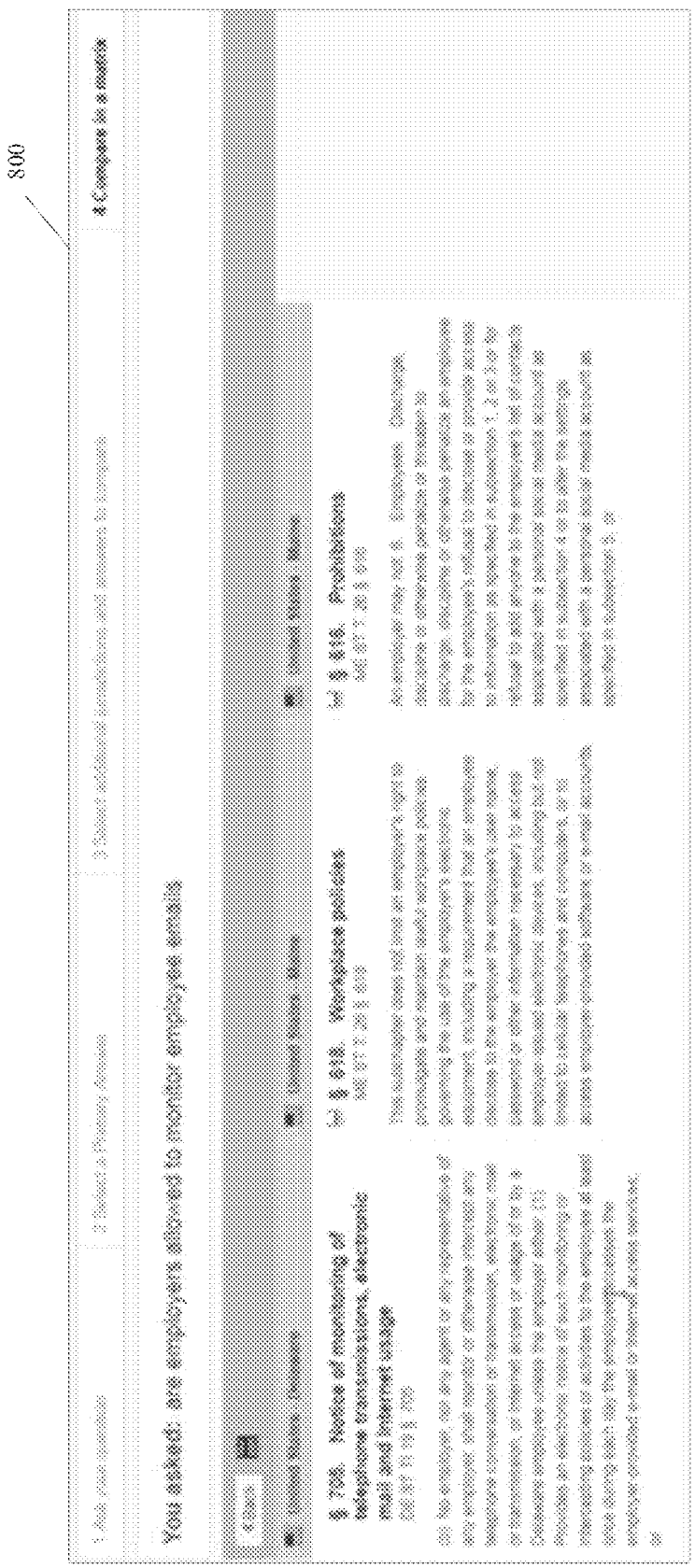
FIG. 8 is a is a screen diagram of an exemplary graphical representation used in conducting legal research across multiple jurisdictions.

Retuning to FIG. 2, a comparison is performed by the comparison module 124 between the selected search result and the selected secondary search result, step 260. In one embodiment, the comparison is presented into a comparison table that identifies relevant data to the user, e.g. jurisdiction, text of the selected answer, citation for the source, number of citing references to the selected answer, analytics and other identifiers pertaining to the quality of a respective selected answer. FIG. 8 illustrates an exemplary comparison matrix.

While various embodiments of the present disclosure have been described above, it should be understood that they have been presented by way of example, and not as limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

Further, FIGS. 1 through 8 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine-readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random-access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A computer-implemented method for conducting legal research across multiple jurisdictions comprising:
   receiving at a server a first user search query from an access device coupled over to the server over a network, the first user search query received at a first graphical user interface displayed at the access device, the first search query comprising one or more search terms;
   executing by the server, using one or more network models, the first search query against a first jurisdictional database comprising one or more legal documents, wherein said legal documents comprises one or more of a court opinion, a court filing and a court transcript;
   identifying by the one or more network models one or more search results that are responsive to the first search query and causing to be displayed a second graphical user interface at the access device, the second graphical user interface having a first window therein that displays a listing of the one or more search results;
   receiving from the access device a selected search result from the one or more search results displayed at the second graphical user interface;
   generating by the server a modified search query comprising a first union of a subset of the one or more search terms of the first search query and one or more relevant terms that are a subset from text of the selected search result, the union of terms generated in response to receipt of the selected result;

executing by the server, using the one or more network models, the modified search query against a second jurisdictional database comprising one or more legal documents;

identifying by the server one or more secondary search results that are responsive to the modified search query;

presenting at the access device the one or more secondary search results that are responsive to the modified search query, the one or more secondary search results displayed in a second window in a third graphical user interface adjacent to a window comprising the selected search result from the one or more search results;

receiving from the access device a selected secondary search result from the one or more secondary search results displayed at the third graphical user interface;

comparing by the server the selected search result to the selected secondary search result; and presenting at the access device the comparison of the selected search result to the selected secondary search result in a fourth graphical user interface, said comparison comprising a text excerpt from each of selected search results, a citation of a source of each of the selected search result, a listing of citing references for each of the selected search results, wherein the listing of citing references comprises one or more legal documents that cites to the search result, and a quality identifier for each of the selected search results.

2. The computer-implemented method of claim 1 further comprising:

receiving at the server, from the access device a selected secondary search result from the one or more secondary search results;

generating by the server a second modified search query comprising a second union of a subset of the one or more search terms of the modified search query and one or more relevant terms that are a subset from text of the selected secondary search result, the second union generated in response to receipt of the selected secondary result;

executing by the server the second modified search query against a third jurisdictional database;

identifying one or more tertiary search results that are responsive to the second modified search query; and presenting the one or more tertiary search results that are responsive to the modified search query, the one or more tertiary search results displayed in a third window in fifth graphical user interface adjacent to at least one window comprising the selected search result and the selected secondary search result.

3. The computer-implemented method of claim 2 further comprising:

receiving a selected tertiary search result;

comparing the selected search result, the selected secondary search result and the selected tertiary result; and presenting at the access device the comparison of the selected search result, the selected secondary search result and the selected tertiary result in a sixth graphical user interface.

4. The computer-implemented method of claim 3 further comprising training the one or more network models using search results, secondary search results, and tertiary search results selected by a plurality of users.

5. The computer-implemented method of claim 3 comprising generating modified search queries or each of a set of jurisdictions selected by the user iteratively based on the first user search query as the only textual input and selection of at least one search result from each of the modified search queries in succession.

6. The computer-implemented method of claim 1 further comprising training the one or more network models using search results and secondary search results selected by a plurality of users.

7. Non-transitory computer readable media comprising program code stored thereon for execution by a programmable processor to perform a method for conducting legal research across multiple jurisdictions comprising:

program code for receiving at a server a first user search query from an access device coupled over to the server over a network, the first user search query received at a first graphical user interface displayed at the access device, the first search query comprising one or more search terms;

program code for executing by the server, using one or more network models, the first search query against a first jurisdictional database comprising one or more legal documents, wherein said legal documents comprises one or more of a court opinion, a court filing and a court transcript;

program code for identifying by the one or more network models one or more search results that are responsive to the first search query and causing to be displayed a second graphical user interface at the access device, the second graphical user interface having a first window therein that displays a listing of the one or more search results;

program code for receiving from the access device a selected search result from the one or more search results displayed at the second graphical user interface;

program code for generating by the server a modified search query comprising a first union of a subset of the one or more search terms of the first search query and one or more relevant terms that are a subset from text of the selected search result, the union of terms generated in response to receipt of the selected result;

program code for executing by the server, using the one or more network models, the modified search query against a second jurisdictional database comprising one or more legal documents;

program code for identifying by the server one or more secondary search results that are responsive to the modified search query;

program code for presenting at the access device the one or more secondary search results that are responsive to the modified search query, the one or more secondary search results displayed in a second window in a third graphical user interface adjacent to a window comprising the selected search result from the one or more search results:

program code for receiving from the access device a selected secondary search result from the one or more secondary search results displayed at the third graphical user interface;

program code for comparing by the server the selected search result to the selected secondary search result; and program code for presenting at the access device the comparison of the selected search result to the selected secondary search result in a fourth graphical user interface, said comparison comprising a text excerpt from each of selected search results, a citation of a source of each of the selected search result, a listing of citing references for each of the selected search results, wherein the listing of citing references comprises one or more legal documents that cites to the search result, and a quality identifier for each of the selected search results.

8. The computer readable media of claim 7 further comprising:
program code for receiving at the server, from the access device a selected secondary search result from the one or more secondary search results;
program code for generating by the server a second modified search query comprising a second union of a subset of the one or more search terms of the modified search query and one or more relevant terms that are a subset from text of the selected secondary search result, the second union generated in response to receipt of the selected secondary result;
program code for executing by the server the second modified search query against a third jurisdictional database;
program code for identifying one or more tertiary search results that are responsive to the second modified search query; and
program code for presenting the one or more tertiary search results that are responsive to the modified search query, the one or more tertiary search results displayed in a third window in fifth graphical user interface adjacent to at least one window comprising the selected search result and the selected secondary search result.

9. The computer readable media of claim 8 further comprising:
program code for receiving a selected tertiary search result;
program code for comparing the selected search result, the selected secondary search result and the selected tertiary result; and
program code for presenting at the access device the comparison of the selected search result, the selected secondary search result and the selected tertiary result in a sixth graphical user interface.

10. A system for conducting legal research across multiple jurisdictions comprising:
a server including a processor configured to:
receive at the server a first user search query from an access device coupled over to the server over a network, the first user search query received at a first graphical user interface displayed at the access device, the first search query comprising one or more search terms;
execute by the server, using one or more network models, the first search query against a first jurisdictional database comprising one or more legal documents, wherein said legal documents comprises one or more of a court opinion, a court filing and a court transcript;
identify by the one or more network models one or more search results that are responsive to the first search query and causing to be displayed a second graphical user interface at the access device, the second graphical user interface having a first window therein that displays a listing of the one or more search results;
receive from the access device a selected search result from the one or more search results displayed at the second graphical user interface;
generate by the server a modified search query comprising a first union of a subset of the one or more search terms of the first search query and one or more relevant terms that are a subset from text of the selected search result, the union of terms generated in response to receipt of the selected result;
execute by the server, using the one or more network models, the modified search query against a second jurisdictional database comprising one or more legal documents;
identify by the server one or more secondary search results that are responsive to the modified search query;
present at the access device the one or more secondary search results that are responsive to the modified search query, the one or more secondary search results displayed in a second window in a third graphical user interface adjacent to a window comprising the selected search result from the one or more search results;
receive from the access device a selected secondary search result from the one or more secondary search results displayed at the third graphical user interface;
compare by the server the selected search result to the selected secondary search result; and
present at the access device the comparison of the selected search result to the selected secondary search result in a fourth graphical user interface, said comparison comprising a text excerpt from each of selected search results, a citation of a source of each of the selected search result, a listing of citing references for each of the selected search results, wherein the listing of citing references comprises one or more legal documents that cites to the search result, and a quality identifier for each of the selected search results.

11. The system of claim 10 wherein the server is further configured to:
receive at the server, from the access device a selected secondary search result from the one or more secondary search results;
generate by the server a second modified search query comprising a second union of a subset of the one or more search terms of the modified search query and one or more relevant terms that are a subset from text of the selected secondary search result, the second union generated in response to receipt of the selected secondary result;
execute by the server the second modified search query against a third jurisdictional database; identify one or more tertiary search results that are responsive to the second modified search query; and
present the one or more tertiary search results that are responsive to the modified search query, the one or more tertiary search results displayed in a third window in fifth graphical user interface adjacent to at least one window comprising the selected search result and the selected secondary search result.

12. The system of claim 11 wherein the server is further configured to:
receive a selected tertiary search result;
compare the selected search result, the selected secondary search result and the selected tertiary result; and
present at the access device the comparison of the selected search result, the selected secondary search result and the selected tertiary result in a sixth graphical user interface.

* * * * *